United States Patent [19]

Koseki

[11] Patent Number: 5,008,510
[45] Date of Patent: Apr. 16, 1991

[54] LASER PUNCH PRESS, AND BEAM DETECTION DEVICE FOR ADJUSTING THE LASER BEAM PATH

[75] Inventor: Ryoji Koseki, Fullerton, Calif.

[73] Assignee: Amada Company, Limited, Kanagawa, Japan

[21] Appl. No.: 459,298

[22] Filed: Dec. 29, 1989

[51] Int. Cl.⁵ .............................................. B23K 26/00
[52] U.S. Cl. ............................. 219/121.7; 219/121.79; 219/121.82; 219/121.84
[58] Field of Search ............ 219/121.7, 121.71, 121.82, 219/121.84, 121.6, 121.85, 121.78, 121.79

[56] References Cited

U.S. PATENT DOCUMENTS 4,698,480  10/1987  Klingel ............................ 219/121.67

Primary Examiner—C. L. Albritton
Attorney, Agent, or Firm—Wigman & Cohen

[57] ABSTRACT

A punch press having a laser cutting device incorporated therein, including a laser cutting head, a laser generator spaced from the punch press, and a laser beam path adjusting device located between the laser generator and the cutting head is disclosed. More particularly, there is disclosed such a punch press further including a plurality axes, and including a plurality of bend mirrors to redirect the laser beam. Devices are provided for obtaining accurate central alignment and focussing of the beam.

14 Claims, 15 Drawing Sheets

LASER PUNCH PRESS, AND BEAM DETECTION DEVICE FOR ADJUSTING THE LASER BEAM PATH

BACKGROUND OF THE INVENTION

1. Field of the Invention

The present invention relates to a laser punch press, a laser process head unit for the laser punch press, a connection device which connects the laser process head unit to a laser generator, and a beam detection device used for adjusting the laser beam path.

2. Description of the Prior Art

Conventionally, the development of a laser punch press involves combining a punch press, such as, for example, a turret punch press, with a laser process device for carrying out a laser process. An example of a laser punch press combining a punch press and a laser process device to perform a punching process and a laser process on a plate-shaped workpiece is the device disclosed in U.S. Pat. No. 4,201,905, wherein a laser process head is mounted on a punch press frame, and a laser beam generated by a laser generator positioned at a distance from the punch press is adapted to be conducted to the laser process head.

Another example is the device disclosed in Japanese Laid-open Utility Model Publication No. Sho-63-7386, wherein a laser process head is mounted on a die mounting holes in a turret of a turret punch press so as to be able to perform a punching process and a laser process on a workpiece.

In both these types of laser punch presses, a punching process and a laser process are performed on a workpiece, so that while the punching process is being carried out a very severe vibration is produced. On the other hand, while the laser process is being performed, a laser beam generated in a laser generator is conducted to the laser process head and the laser beam is directed onto the workpiece from the laser process head to perform the laser process.

A problem in this type of laser punch press, is that, as a result of the severe vibration occurring during the punching process a deviation is readily produced in the laser path of the optical system which leads the laser beam to the laser process head from the laser generator.

In addition, it is very difficult to add the laser process function to an existing punch press to combine the punching process and the laser process.

Also, in a case where a laser processing device is incorporated with a punch press such as, for example, a turret punch press, in which the laser process head is mounted on the turret, it is necessary to release the connection between the laser process head and the laser generator when the turret is to be rotated. This causes the problem that the structure of the connector between the laser process head and the laser generator must be very complicated.

A futher problem is the difficulty in detecting the position of the center and the focal point of the laser beam in the apparatus in which the laser process head is mounted on the punch press.

SUMMARY OF THE INVENTION

This invention has been made in view of the above problems. Accordingly, a first object of the present invention is to provide a laser punch press wherein a deviation in the optical system which leads the laser beam to the laser process head is difficult to produce, and even if, for some reason, such a deviation does occur a realignment is easily performed.

A second object of the present invention is to provide a laser process head unit which can be easily mounted on an existing punch press, and which is well protected from severe vibrations which occur during the punching process.

A third object of the present invention is to provide a conneciton device by which the laser process head unit mounted on the punch press and the laser generator can be easily connected and disconnected.

A fourth object of the present invention is to provide a beam detection device in which the center of the laser beam and the position of the focal point of the laser beam can be easily detected when adjusting the path of the laser beam under the condition that the laser process head unit is mounted on a punch press.

These objects are achieved in the present invention by a laser punch press comprising a laser process head unit mounted in a suitable position on a punch press which performs a punching operation on a plate by means of an upper die supported in an upper die holder and a lower die supported in a lower die holder; a laser generator provided in a position at a distance from a processing station on a punch press; and a beam path adjustment device for adjusting a beam path leading a laser beam from the laser generator to the laser process head unit. The beam path adjustment device is provided with a plurality of bend mirrors which suitably bend the laser beam and are disposed on the laser generator side at a distance from the laser process head unit. Specifically, the beam path adjustment device comprises a first bend mirror which reflects the laser beam from the laser generator in the V-axis direction; a second bend mirror which is supported on a V-axis table freely positionally adjustable in the V-axis direction and reflects the laser beam, which has been directed in the V-axis direction by the first bend mirror, to the U-axis direction at right angles to the V-axis; and a third bend mirror supported on an U-axis table which is supported on the V-axis table in a manner to freely allow positional adjustment in the U-axis direction, on which the laster beam, previously reflected on the second bend mirror is reflected toward the laser process head unit.

Specifically, according to this invention, because the device for adjusting the beam path which conducts the laser beam to the laser process head unit is provided on the laser generator side, it is virtually unaffected by the severe vibration which is occurred during the punching operation. Also, when a deviation of the beam path is produced in the optical system which leads the laser beam to the laser process head unit, the bend mirrors provided on the beam path adjustment device at a position distant from the punch press can be really adjusted, so that the beam path is easily centered.

In addition, the laser process head unit of the present invention comprises a cylindrical outer guide which can be mounted on or dismounted from a tool mounting hole formed in an upper die holder on the punch press; a cylindrical inner guide for supporting a nozzle, a condensing lens, and a bend mirror which reflects a laser beam from a laser generator side perpendicularly downward to the condensing lens side; and a vibration-prevention support device which supports the inner guide to allow vertical movement inside the outer guide under the condition that transmission of vibration from the outer guide is shielded. The vibration-prevention support device comprises an elastic body which supports the inner guide in a floating condition with respect to the outer guide, an air damper which can freely expand and contract between the outer guide and the inner guide, and an accumulator which ensures pressure in the air damper.

Specifically, the laser process head unit of the present invention has an outer guide and an inner guide forming a double structure, and is provided with a vibration-prevention support device comprising an elastic body and an air damper between the outer guide and the inner guide for supporting the inner guide in a floating condition, so that, even in the case where the outer guide undergoes severe vibration in the vertical and horizontal directions during the punching process, the inner guide is shielded from this vibration. Accordingly, the optical system including the condensing lens and the like supported by the inner guide is protected from vibration.

Further, the connection device of the present invention is used to connect the laser process head unit mounted in a suitable position on the punch press to the laser generator provided in a position distant from the punch press processing station. This connection device comprises a first interface unit provided on the punch press side and a second interface unit provided on the laser generator side. The first interface unit comprises a tube guide port for protecting a laser beam which is incident on a bend mirror in the laser processing head unit, a gas connector for an assist gas which is supplied to the laser process head unit, and an electrical connector connected to an electrical device provide in the laser processing head unit. The second interface unit comprises a tube guide port, a gas connector and an electrical connector which corresponds respectively with the tube guide port, the gas connector and the electrical connector of the first interface unit. At least one of the first interface unit of the second interface unit is constructed such that it can freely approach to or retreat from the other.

Therefore, according to this invention, it is possible to easily and frequently connect and disconnect the laser process head unit mounted on the punch press and the beam path, the gas distribution path, and the electric wiring on the laser generator side. Therefore, since the laser process head unit can be easily mounted on the tool mounting hole of the freely rotatable turret on the turret punch press, it becomes possible to easily add the laser process function to an existing turret punch press.

Further, the beam detection device according to the present invention comprises a casing which is mountable and dismountable to and from the lower die holder on a punch press; and U-V table which is supported in a manner a freely adjustable in the U-axis and V-axis directions on the casing; a Z-table supported in a manner freely adjustable vertically on the U-V table and provded with a small diameter aperture; and a power sensor which detects the output of the laser beam passing through the small diameter aperture on the Z table.

Accordingly, the diameter of the laser beam generated by the laser generator is comparatively small. The center of the laser beam can be detected by moving the U-V table such that this small diameter laser beam passes through the small diameter aperture, detecting the power distribution of the laser beam passing through the small aperture using the power sensor, and detecting whether or not the position corresponds to the maximum detected value. Further, in the case where the position of the focal point of the condensing lens on the laser process head unit is inspected after the center of the laser beam has been detected, it is possible to easily detect the position of the focal point by moving the Z table vertically until the small diameter aperture coincides with the position of the focal point, because the value detected by the power sensor is at a maximum at this point.

In addition, the beam detection device according to the present invention comprises a casing which is feely mountable and dismountable to and from the lower die holder of the punch press, a rotary holder supported in a freely rotatable manner on the casing, a beam splitter which is supported in the rotary holder and splits the laser beam into many parts; a plurality of power sensors which detect the outputs from the many parts of the split laser beam, a comparator which compares the values detected by the power sensor, and a beam shielding member which shields one part of the laser beam directed onto the beam splitter, which can have its position changed between a shielding state positon and a non-shielding state condition.

Therefore, according to this invention, by detecting the output of the laser beam which is split by the beam splitter with the power sensors and oscillating the laser beam so as to equalize the values detected by each power sensor, the center of the laser beam can be detected. In addition, in the state where the beam shield member is positioned in the shielding state position and one part of the laser beam is shielded therewith, by moving the condensing lens provided on the laser process head unit vertically and comparing the values detected by each of the power sensors, it can be determined whether or not the beam shield member is positioned at the focal point. It is therefore possible to detect the focal point position of the condensing lens.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1:
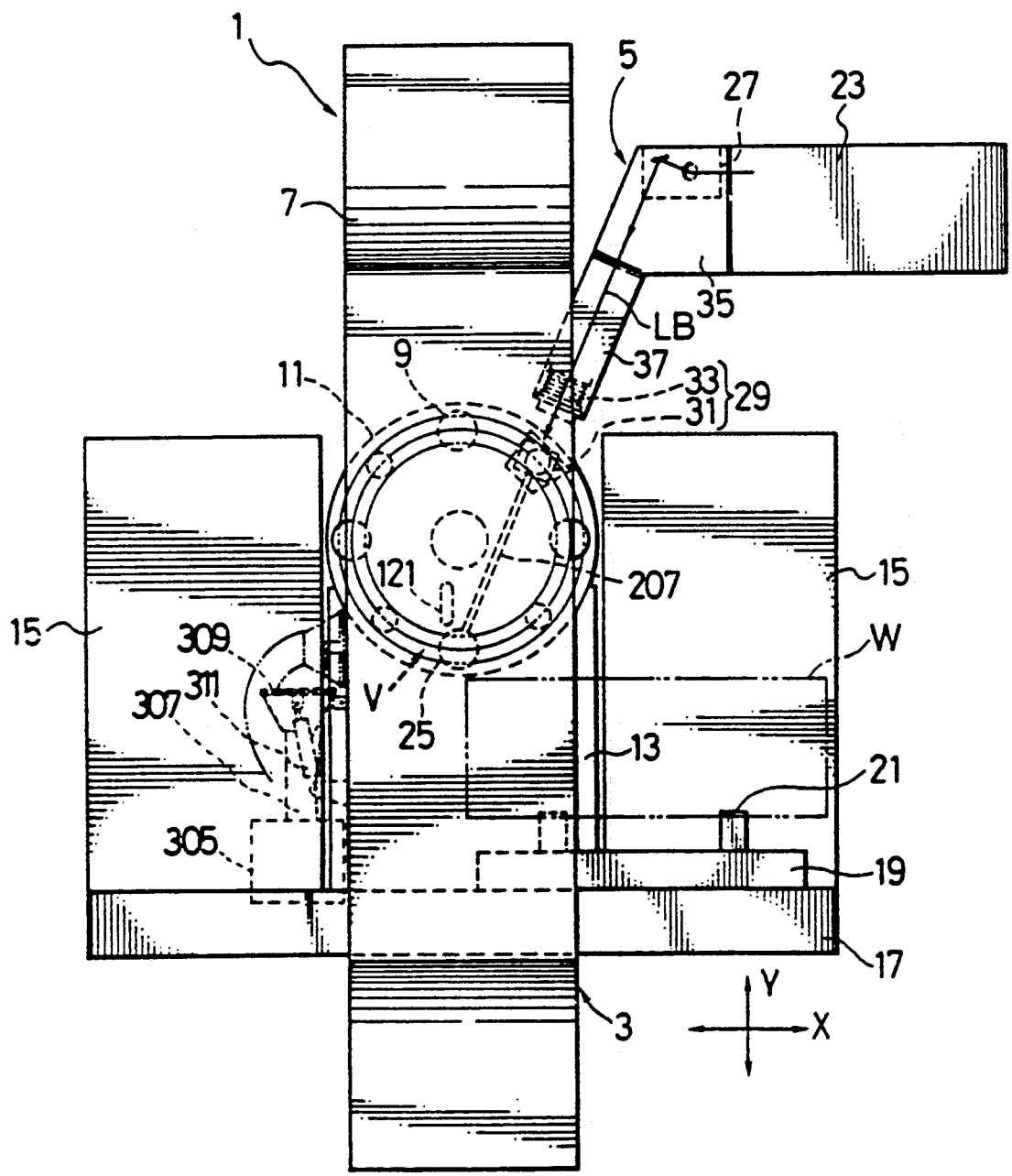
FIG. 1 is an explanatory plan drawing showing the whole configuration of one embodiment of the apparatus according to the present invention.

Now referring to FIG. 1, a laser punch press 1 comprises a punch press 3 for performing a punching operation on a plate-shaped workpiece W and a laser process system 5 for performing a laser process.

In this embodiment, as the punch press 3, a turret punch press is given as an example, but the present invention is not limited to the use of a turret punch press. Any normally-used type of punch press is acceptable. The structure of a turret punch press is commonly known. However, a brief outline of the type of punch press will be given here.

Specifically, a turret punch press is provided with a C-shaped or a square-arch-shaped frame 7. A disc-shaped upper die holder (hereinafter referred to as "upper turret") 11 in which a plurality of upper dies 9 are exchangeably supported is supported in a freely rotatable manner on the frame 7, and a lower die holder (hereinafter referred to as "lower turret"-not shown in FIG. 1) in which a plurality of lower dies are exchangeably supported is provided on the frame 7 in vertical opposition to the upper die holder 11. At a positon above the upper die holder 11, a striker (not shown), which strikes the upper die 9 positionally indexed at a process station by the rotation of the upper die holder 11, is provided in a manner allowing free vertical movement.

A fixed table 13, on which the workpiece W is horizontally supported, and a movable table 15 are provided on the turret punch press. The movable table 15 is integrally mounted on both sides of a carriage base 17 which extends in the X-axis direction (the lateral direction in FIG. 1), which can move in the Y-axis direction together with the carriage base 17. A carriage 19 is supported on the carriage base 17 in a manner allowing free movement in the X-axis direction. A workpiece clamp 21 which can clamp the workpiece W is mounted on the carriage 19.

Because the turret punch press of the type described above is commonly known, a more detailed description and an explanation of the operation of this turret punch press will be omitted.

The laser process system 5 comprises a laser generator 23 provided in a position separately from the process station of the punch press 3, and a laser process head unit 25 installed in a mountable/dismountable manner in a tool mounting hole in the upper die holder 11 of the punch press 3. A beam path adjustment device 27 which conducts a generated laser beam LB from the laser generator 23 to the laser process head unit 25 is provided on the laser generator 23 side. In addition, there is provided a connection device 29 which can connect the laser generator 23 with the laser process head unit 25. The connection device 29 comprises a first interface unit 31 which is connected to the laser process head unit 25, and a second interface unit 33 which can be connected to the first interface unit 31. The second interface unit 33 is provided on the laser generator 23 side.

More specifically, the beam path adjustment device 27 is positioned in a housing 35 provided on and connected to the output side of the laser generator 23. The second interface unit 33 is built into a housing extension section 37, which extends fron the housing 35 toward the upper die holder 11 of the punch press 3. Also, the first interface unit 31 is mounted on the die holder 11 in such a manner that when the laser process head unit 25 is positionally indexed at the process station, the first interface unit 31 opposes the second interface unit 33.

In the laser process system 5 as described above, after the laser process head unit 25 is positionally indexed at the process station on the punch press 3, the laser beam LB fron the laser generator 23 can be supplied to the laser process head unit 25 by connecting the first and second interface units 31, 33 together. At the same time, a gas flow channel for an assist gas or the like, and the electric wiring are connected, so that the laser process head unit is set in the condition that laser processing can be performed.

A plurality of bend mirrors are provided in the beam path adjustment device 27 to suitably bend the laser beam LB to conduct the laser beam LB from the laser generator 23 directly to the laser process head unit 25.

Figure 2:
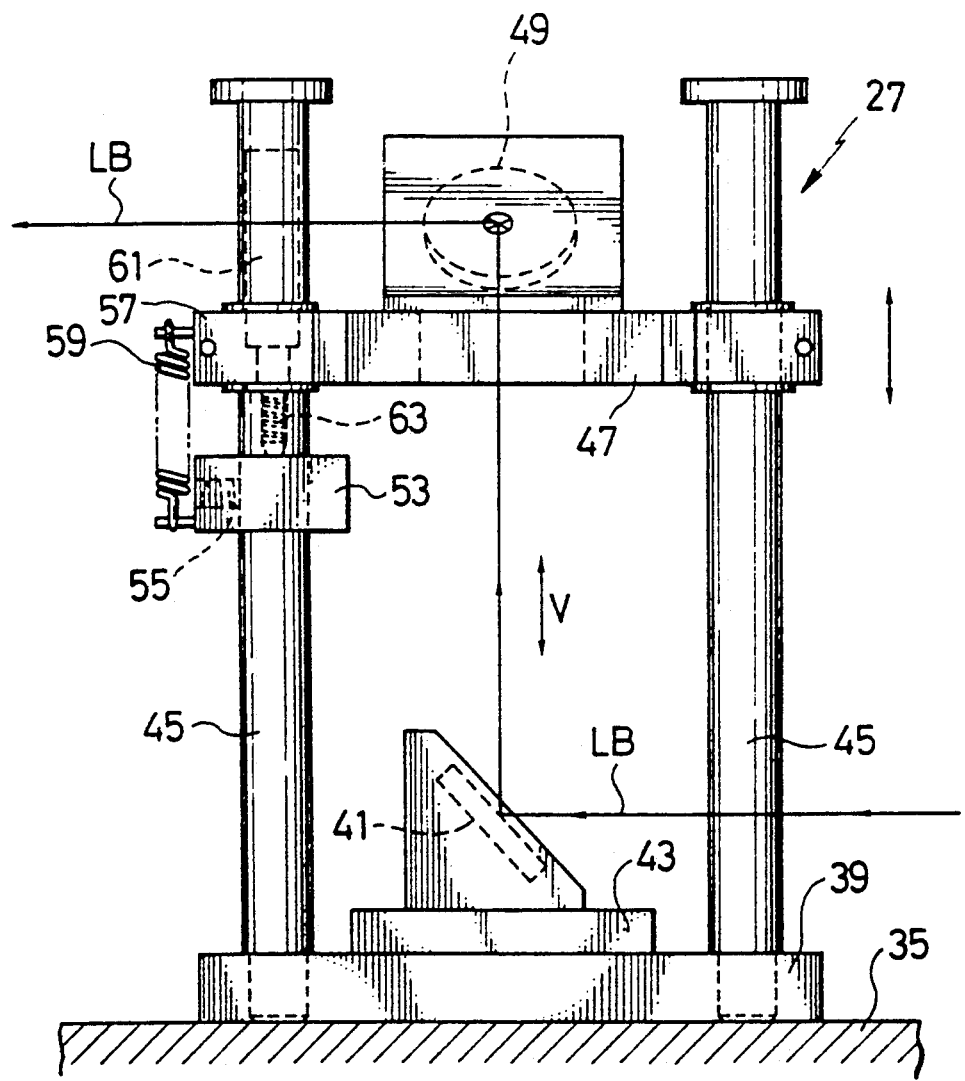
FIG. 2 is an enlarged explanatory drawing of the beams path adjustment device as shown in FIG. 1.
Figure 3:
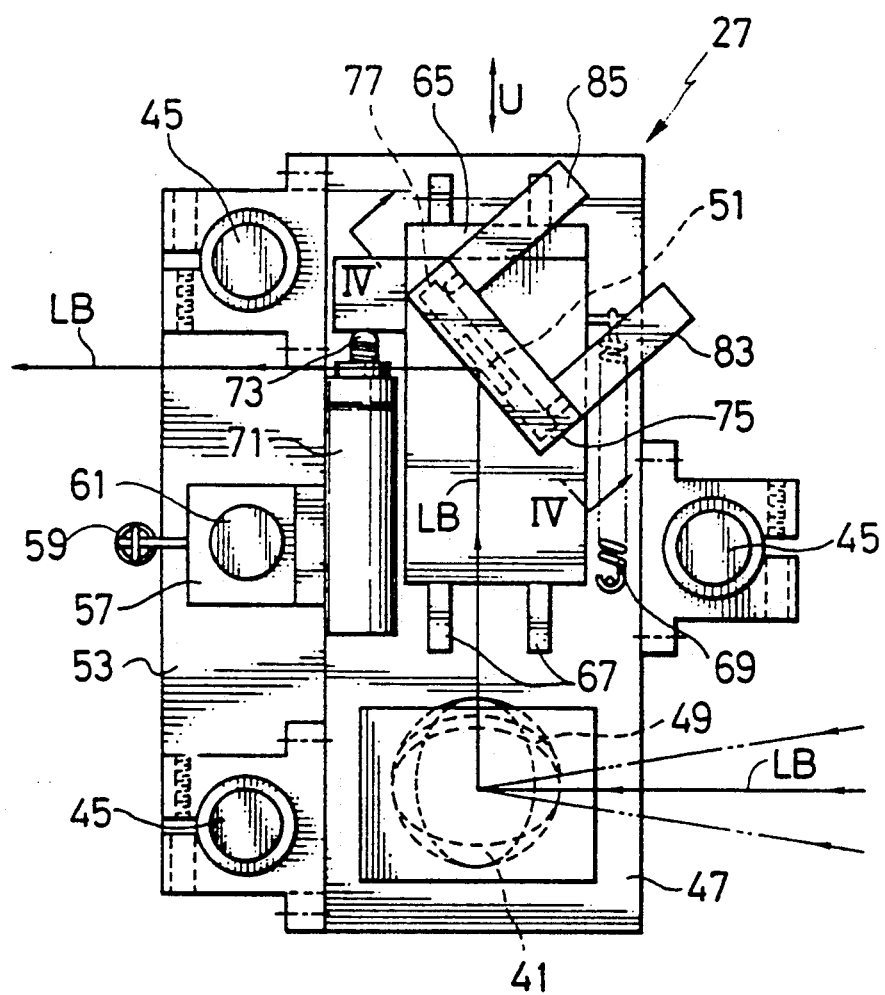
FIG. 3 is a plan view of FIG. 2.

The beam path adjustment device 27 has the configuration shown in FIG. 2 and FIG. 3. Specifically, the beam path adjustment device 27 is provided with a base plate 39 fixed to the housing 35. A first bend mirror 41, which receives the horizontally incident laser beam LB generated by the laser generator 23 and reflects the laser beam LB in the V-axis direction corresponding to the Y-axis direction, is provided on the base plate 39. The first bend mirror 41 is slantingly mounted on a rotary table 43 which can be rotatably adjusted with respect to the V-axis.

Accordingly, even when there is some deviation in the angle of incidence of the laser beam LB in the horizontal direction relative to the first bend mirror 41, the laser beam LB can be accurately reflected in the V-axis direction by rotary adjustement of the rotary table 43.

A plurality of guide posts 45 which extend in the V-axis direction are provided on the base plate 39. A V-axis table 47 is supported in a positionally-adjustable manner on the guide posts 45 through a plurality of slide bushings. A second bend mirror 49 is mounted on the V-axis table 47 to receive the laser beam LB reflected in the V-axis direction at the first bend mirror 41 and reflect the laser beam LB in the U-axis direction corresponding to the V-axis direction. In addition, a third bend mirror 51 is mounted on the V-axis table 47 to horizontally reflect the laser beam LB from the second bend mirror 49 toward the laser process head unit 25 mounted on the punch press 3.

A stopper plate 53 is adjustably secured by a securing bolt 55 between some of guide posts 45 in order to adjust a displacement in the V-axis direction of the laser beam LB to be directed to the laser process head unit 25. A coil spring 59 is elastically inserted between a motor bracket 57 installed on the V-axis table 47 and the stopper plate 53. A V-axis adjusting motor 61 for adjusting a position of the V-axis table 47 is mounted on the motor bracket 57. The V-axis adjusting motor 61 is constructed so that a plunger 63, such as a threaded rod, advances or retreats in accordance with the forward or reverse rotation of the motor 61, and the tip of the plunger 63 is abutting on the stopper plate 53.

According to the above configuration, a large positional adjustment of the V-axis table 47 in the V-axis direction can be performed by moving the stopper plate 53 and the V-axis table 47 along the guide posts 45 under the condition that the securing bolt 55 is loosened. Also, under the condition that the stopper plate 53 is secured on the guide post 45, the V-axis table 47 can be finely adjusted in the V-axis direction by suitably controlling and rotating the V-axis adjusting motor 61 with the control of a control device such as, for example, a computer or a numerical control device. Specifically, according to the above configuration, the position of the laser beam LB directed toward the laser process head unit 25 from the third bend mirror 51 can be adjusted in the V-axis direction.

The third bend mirror 51 is mounted on the U-axis table 65 in order to adjust the position of the laser beam LB which is directed toward the laser process head unit 25 from the third bend mirror 51. The U-axis table 65 is movable along U-axis guides 67 provided on the V-axis table 47. A coil spring 69 is elastically inserted between the U-axis table 65 and the V-axis table 47. The tip of an advancing or retreating plunger 73 of a U-axis adjusting motor 71 mounted on the V-axis table 47 is abutting on a part of th U-axis table 65.

In the above configuration, by driving the U-axis adjusting motor 71 such that the plunger 73 advances or retreats in a suitable manner, the position of the U-axis table 65 can be adjusted, so that the position of the laser beam LB directed toward the laser process head unit 25 from the third bend mirror 51 can be adjusted in the U-axis direction.

Further, in order to accurately adjust the direction of the laser beam LB reflected toward the laser process head unit 25 from the third bend mirror 51, the third bend mirror 51 is constructed so as to allow free swinging adjustment in two axes directions.

Figure 4:
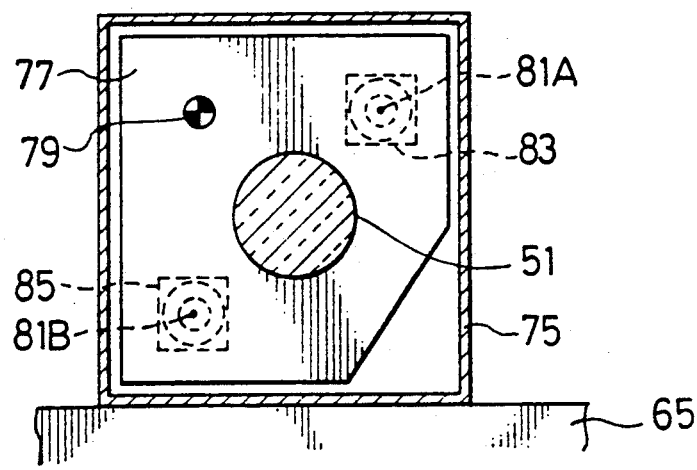
FIG. 4 is an enlarged drawing corresponding to the section IV—IV in FIG. 3, viewed in the direction of the arrows.

More specifically, a shown in FIG. 4, the third bend mirror 51 is installed on a mirror holder 77 which is pivotably disposed within a mirror casing 75 mounted on the U-axis table 65. The mirror holder 77 is pivoted in the mirror casing 75 on a pivot point 79 through a ball joint or the like. At two points 81A, 81B at some distance from, and forming a right angle about the pivot point 79, tip portions of plungers which are protrusively or retractively provided on a U-axis directional adjusting motor 83 and a V-axis directional adjusting motor 85, respectively, as shown in FIG. 3, are abutted on the mirror holder 77. Although a more detailed drawing has been omitted, the mirror holder 77 is usually biased, by means of, for example, a spring or the like, so that it always abuts on the plunger of the adjusting motors 83, 85.

According to the above configuration, the mirror holder 77 can be suitably caused to swing in two directions by suitable rotational control of the U-axis directional adjusting motor 83 and the V-axis directional adjusting motor 85 using a control device, so that the direction of the laser beam LB directed from the third bend mirror 51 toward the laser process head unit 25 can be precisely adjusted.

Next, a detailed explanation will be given of the laser processing head unit 25 which receives the laser beam LB reflected from the third bend mirror 51 mounted on the beam path adjustment device 27.

Figure 5:
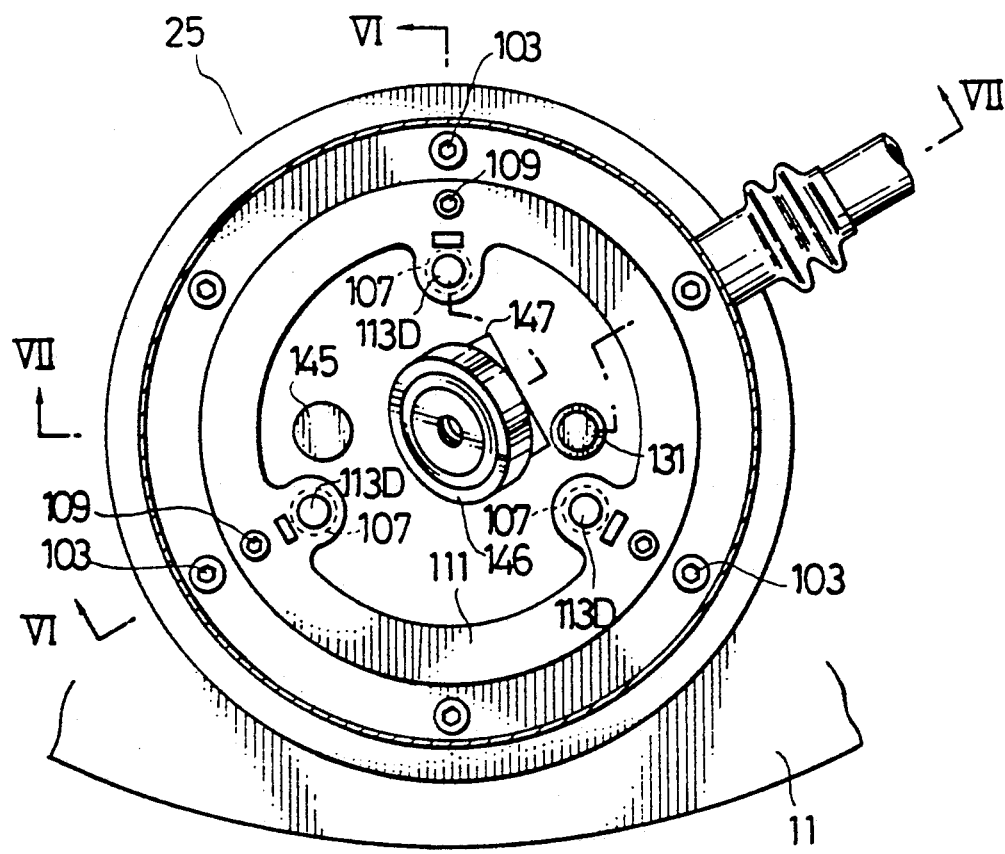
FIG. 5 is an enlarged detail drawing of the part indicated by the arrow V in FIG. 1.
Figure 6:
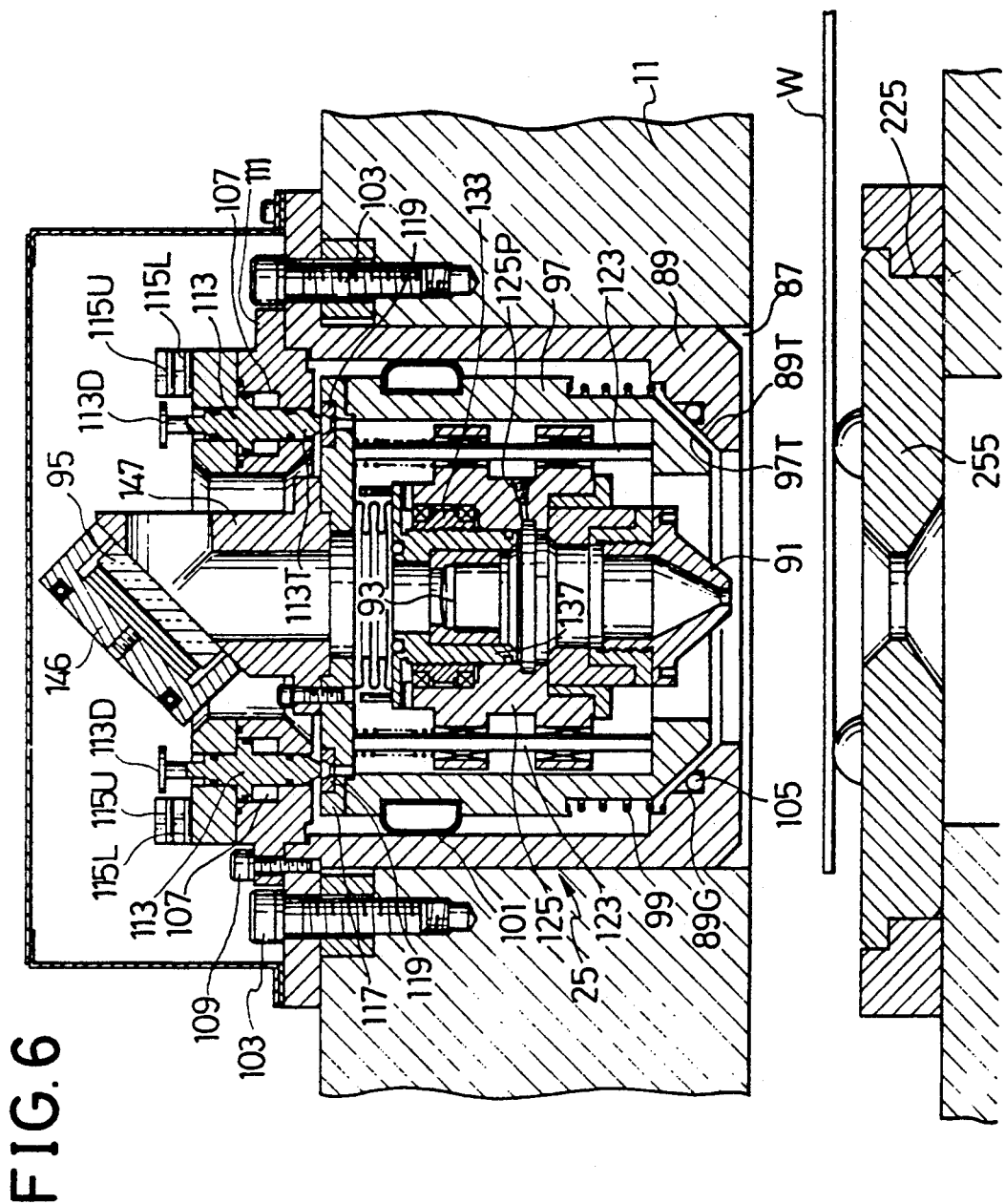
FIG. 6 is a sectional drawing viewed along the line VI—VI in FIG. 5.
Figure 7:
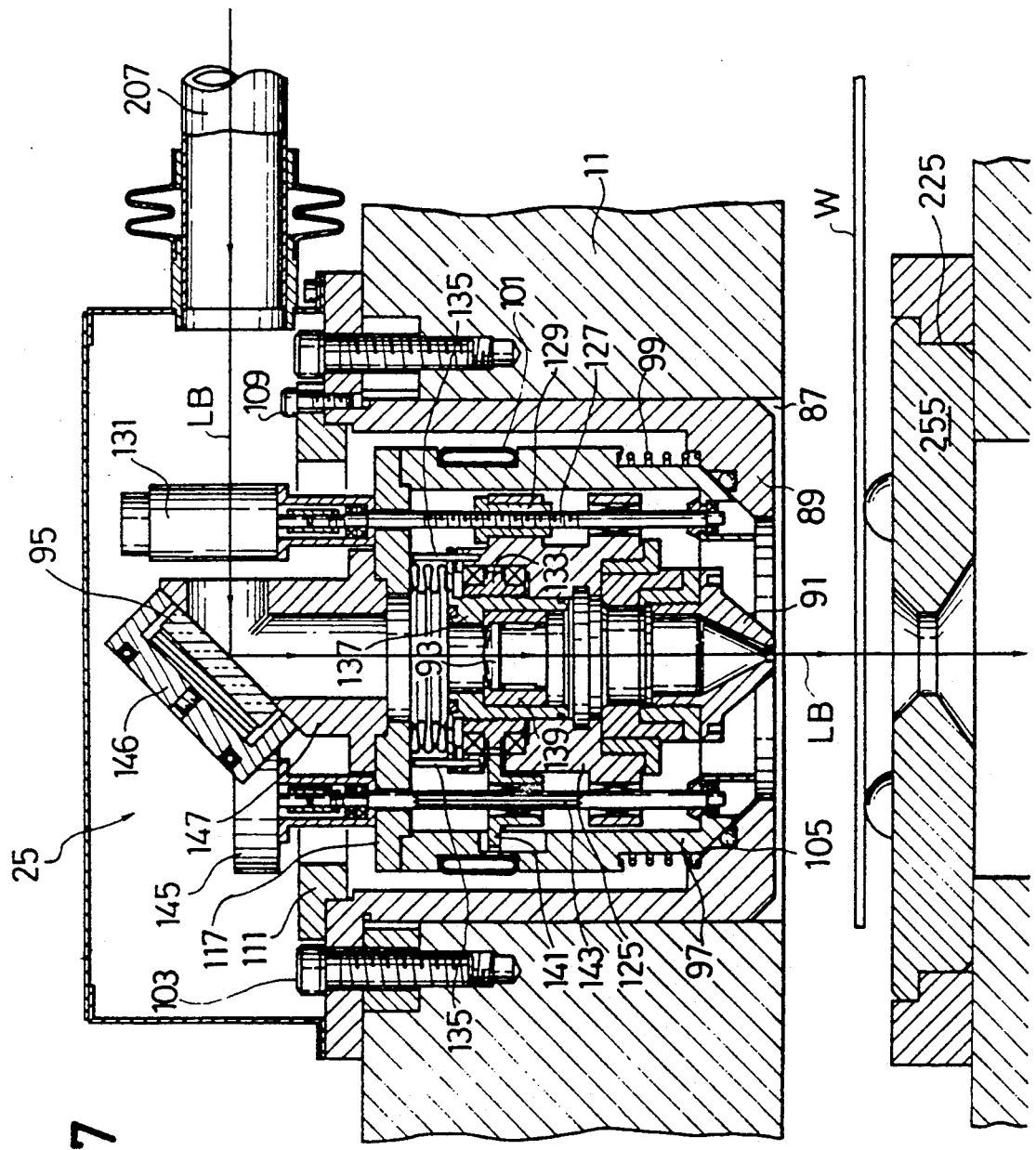
FIG. 7 is a sectional drawing viewed along the line VII—VII in FIG. 5.

As shown in detail in FIG. 5 to FIG. 7, the laser processing head unit 25 is removably mounted in a tool mounting hole 87 formed in the upper die holder 11 (upper turret) of the punch press 3.

More specifically, the laser processing head unit 25 basically comprises a cylindrical outer guide 89 removably installed in the tool mounting hole 87, and a cylindrical inner guide 97 which supports a nozzle 91 for emitting an assist gas to the processing position of the workpiece W, a condensing lens 93 for condensing the laser beam LB and a bend mirror 95 for reflecting the incoming laser beam LB from the beam path adjustment device 27 at right angles toward the condensing lens 93, or the like.

The inner guide 97 is built into the outer guide 89 in a manner allowing free vertical movement. A vibration-preventing support device which supports the inner guide 97 in a state shielded from vibrations transmitted from the outer guide 89 is provided between the inner guide 97 and the outer guide 89. The vibration-preventing support device comprises an elastic member 99 such as, for example, an air damper or a coil spring, which supports the inner guide 97 in a floating state, and a freely expansible/contractible air damper 101 positioned between the inner peripheral surface of the outer guide 89 and the outer peripheral surface of the inner guide 97.

More specifically, the outer guide 89 is co-axially disposed within the tool mounting hole 87, and is secured by a plurality of bolts 103. A tapered section 89T is formed on the lower portion of the inner peripheral surface of the outer guide 89. A plurality of steel balls 105 are held through a retainer (not shown) in a peripheral groove 89G formed in the tapered section 89T in such a manner that the balls 105 can move slightly in the radial direction. The steel balls 105 are provided in order to assist the rotation of the inner guide 97 with respect to the outer guide 89 to proceed smoothly, when a tapered selection 97T formed at the lower tip of the inner guide 97 has engaged with the tapered section 89T and then the inner guide 97 is slightly rotated with respect to the outer guide 89 to precisely adjust the direction therebetween. The steel balls 105 can be eliminated under certain conditions.

As outlined above when the tapered section 97T of the inner guide 97 engages with the tapered section 89T of the outer guide 89, the outer guide 89 is co-axially disposed within the inner guide 97, so that the axes of the nozzle 91 and the condensing lens 93 are stable in a specified position. As a result, the laser process becomes possible.

Accordingly, a plurality of downward-operating cylinders 107 are provided on the upper portion of the outer guide 89 in order to push down the inner guide 97 in opposition to the biasing force of the elastic member 99 which supports the inner guide 97 in a floating condition.

The downward-operating cylinders 107 are provided in a plurality of positions on a ring member 111 fastened to the upper surface of the outer guide 89 with a plurality of bolts 109. The lower section of a piston pin 113 provided in a manner allowing free vertical movement is formed into a tapered section 113T. Further, a dog 113D is provided on the upper end of the piston pin 113 which projects upward from the downward-operating cylinders 107. A pair of sensors 115U, 115L which detect the ascent or descent of the dog 113D are provided on each downward-operating cylinder 107. On the other hand, an upper plate 117 is mounted on the upper portion of the inner guide 97. On the upper plate 117, there is provided a bushing 119 in which a tapered hole which is engageable with the tapered section 113T of the piston pin 113 is provided.

In this configuration, in the state in which the air has been discharged from air damper 101 and the inner guide 97 can more vertically, when operating fluid is supplied to the downward-operating cylinder 107 such that the piston pin 113 descends, first, the tapered section 113T of the piston pin 113 engages with the tapered hole of the bushing 119 to restrain the rotation of the inner guide 97 and position it in the circumferential direction. After this, when the piston pin 113 descends further, the inner guide 97 descends in opposition to biasing force of the elastic number 99, so that the tapered section 97T of the inner guide 97 engages with the tapered section 89T of the outer guide 89. Accordingly, as previously outlined, the center axis of the outer guide 89 conforms to the center axis of the inner guide 97, so that the laser process is enabled. Then, the low sensor 115L confirms whether the inner guide 97 is positioned or not by the detection of the dog 113D.

Conversely, when the piston pin 113 of the downward-operating cylinder 107 ascents, the downward pressure of the inner guide 97 is released, so that the inner guide 97 is lifted by the biasing force of the elastic member 99 and then is supported in a floating condition. Accordingly, in this condition, when air is supplied to the air damper 101 such that it expands, the inner guide 97 is supported in a state where transmission of vibration from the outer guide 89 is shielded. Then, the fact that the inner guide 97 is supported in a floating condition is confirmed by detecting the dog 113D with the upper sensor 115U.

When the inner guide 97 is supported in a floating state as described above, in order to guarantee the pressure of the air damper 101, an accumulator 121 (see FIG. 1) connected to the air damper 101 is provided at a suitable position of the laser process head unit 25. In this embodiment, the accumulator 121 is provided on the die holder 11. Accordingly, even in the case where a small amount of air leaks from one part of the air piping, the pressure of the air damper 101 is guaranteed and the inner guide 97 is reliably supported.

As described, when the laser process is carried out in the state where the tapered section 97T of the inner guide 97 engages with the tapered section 89T of the outer guide 89, it is necessary that the space between the workpiece W and the lower tip of the nozzle 91, and the focal point position of the condensing lens 93, are adjusted as required in accordance with the thickness of the workpiece W and the like.

Therefore, in this embodiment of the present invention, a vertical slide 125 which supports the nozzle 91 and the condensing lens 93 is provided in a manner allowing free vertical movement inside the inner guide 97.

More specifically, a plurality of vertical guide columns 123 are provided inside the inner guide 97, and the vertical slide 125 is elevated and lowered while being guided on the guide support columns 123. The nozzle 91 is mounted on the lower section of the vertical slide 125.

In order to adjust the vertical position of the vertical slide 125, a freely rotatable ball screw 127 (see FIG. 7) is provided in parallel with the guide column 123. A ball nut 129 provided on the vertical slide 125 engages with the ball screw 127. A servo motor 131 for raising and lowering the nozzle mounted on the upper plate 117 is linkingly coupled to the ball screw 127. A pulse encoder for detecting rotation is provided on the servo motor 131, which can detect the vertical position of the nozzle 91 by detecting the rotation of the ball screw 127.

Accordingly, because the vertical slide 125 is moved vertically as a result of suitable rotation of the ball screw 127 by the servo motor 131, the vertical position of the nozzle 91 can be adjusted. In addition, a distance sensor which can detect the space between the workpiece W and the nozzle 91 is provided on the lower end of the nozzle 91, so that the space between the nozzle 91 and the workpiece W can be properly controlled.

In order to control the vertical position of the focal point of the condensing lens 93, a rotary gear 133 with a female threaded section formed in its inner peripheral surface is supported in a freely rotatable manner on the side of the top section of the vertical slide 125. Inside the rotary gear 133, a cylindrical focal point adjustment holder 137 which regulates rotation by means of a guide pin 135 erected on the upper section of the vertical slide 125 is screwed in a freely vertical-position-adjustable manner. The condensing lens 93 is maintained on the focal point adjustment holder 137 through a lens holder 139.

A small diameter gear 141 which engages with the rotary gear 133 is provided in a freely rotatable manner on the vertical slide 125 in order to rotate the rotary gear 133. Specifically, the small diameter gear 141 is fitted onto a spline shaft 143 by a spline linkage in a manner allowing free vertical movement. The spline shaft 143 is perpendicularly supported on the inner guide 97 in a freely rotatable manner. The upper end of the spline shaft 143 is linkingly coupled to an ultrasonic motor 145 mounted on the upper plate 117.

Accordingly, when the spline shaft 143 is rotated by the ultrasonic motor 145, the rotary gear 133 is rotated via the small diameter gear 141, so that the vertical position of the focal point adjustment holder 137, which engages with the rotary gear 133, is adjusted. The focal point position of the condensing lens 93 which is hold in the focal point adjustment holder 137 can therefore be adjusted vertically.

The bend mirror 95 which reflects the laser beam LB vertically downward toward the condensing lens 93 is supported in a mirror holder 146 which is provided with a water jacket for cooling water. The mirror holder 146 is inclinedly mounted on a tubular holder support which is mounted on the upper plate 117 above the condensing lens 93. The bend mirror 95 is installed in a high position where it is possible to accurately reflect the laser beam LB incident from the beam path adjustment device 27 when the inner guide 97 is descending.

In the laser process head unit 25 having the above configuration, the alignment of the bend mirror 95 and the condensing lens 93 which are proivded as the optical system is important. Therefore, in this embodiment of the present invention, this configuration allows the condensing lens 93 to be centered before mounting the lens 93 to the focal point adjustment holder 137.

Figure 8:
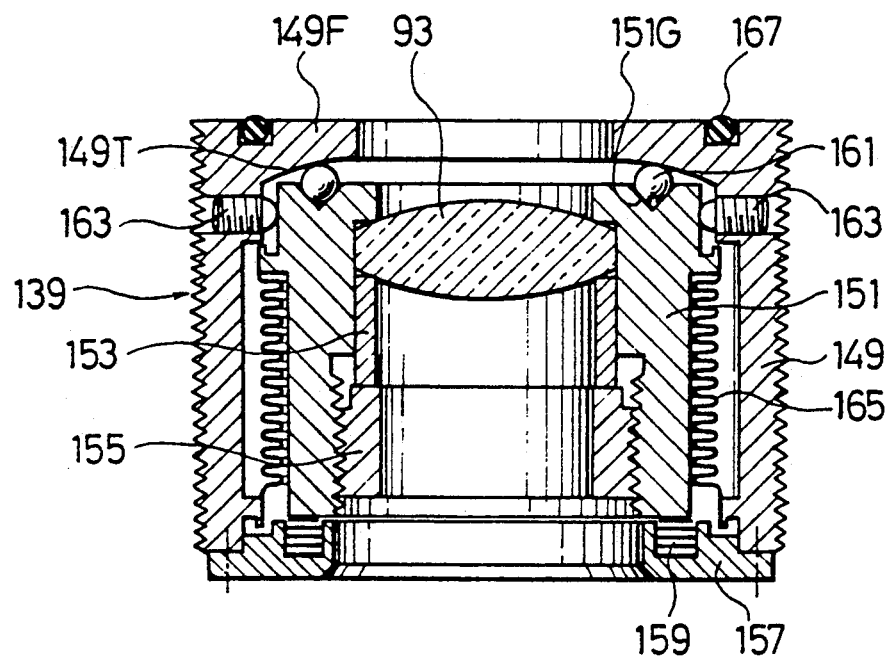
FIG. 8 is a sectional explanatory drawing showing the section on which the condensing lens is mounted.

More specifically, as shown in FIG. 8, the lens holder 139 in which the condensing lens 93 is held comprises a tubular outer holder 149 with a threaded section, which is screwed into the inside of the focal point adjustment holder 137, formed on the outer peripheral surface, and a tubular inner holder 151 which is positioned inside the outer holder 149 and holds the condensing lens 93 therein.

The condensing lens 93 is secured to the inner holder 151 by means of a cylindrical nut 155 which is screwed into the inside of the inner holder 151 and a cylindrical lens supporting member 153. The inner holder 151 is biased in the upward direction by a web spring 159 which is elastically inserted between a ring-shaped spring holder 157 mounted on the bottom of the outer holder 149 and the bottom of the inner holder 151. A plurality of steel balls 161 held inside a ring-shaped groove 151G formed in the upper surface of the inner holder 151 contact a tapered section 149T formed in the lower surface of a flange section 149F of the outer holder 149, thereby enabling to center the inner holder 151.

A plurality of adjusting set screws 163, which can apply a pressure to the top of the inner holder 151 in order to adjust the inner holder 151 in the radial direction, are spirally mounted in a plurality of locations (three or more) on the [outer] peripheral surface of the top section of the outer holder 149 in order to accurately center the inner holder 141 with respect to the outer holder 149. Further, a metal bellows 165 is elastically inserted between the inner holder 151 and the outer holder 149 in order to freely transmit heat from a seal and the inner holder 151 to the outer holder 149. An O-ring 167, which seals a gap between the focal point adjustment holder 137 and the lens holder 139 to be mounted on the holder 137, is mounted on the upper section of the outer holder 149.

As a result of this configuration, it is possible by suitable adjustment of the set springs 163 to smoothly adjust the positional deviation of the inner holder 151 with respect to the outer holder 149 so as to adjust the center of the inner holder 151 or the center of the condensing lens 93 to the center of the outer holder 149. Specifically, this means that the center adjustment action can be performed in advance.

In addition, when an assist gas is supplied from a port 125P (see FIG. 6) formed in the vertical slide 125 into the nozzle 91 while the laser process is being performed in the state where the lens holder 139 is mounted in the focal point adjustment holder 137, the inner pressure applied to the condensing lens 93 and the like is received by the steel balls 161, so that the inner holder 151 does not move in the axial direction.

When the laser process head unit 25 mounted on the upper die holder (upper turret) 11 of the punch press 3 is positionally indexed at the process station and the laser process is carried out, it is necessary that the first and second interface units 31, 33 on the connection device 29 be connected. Accordingly, a detailed explanation will now be given of the first and second interface units 31, 33.

First, the configuration of the second interface unit 33 will be explained.

Figure 9:
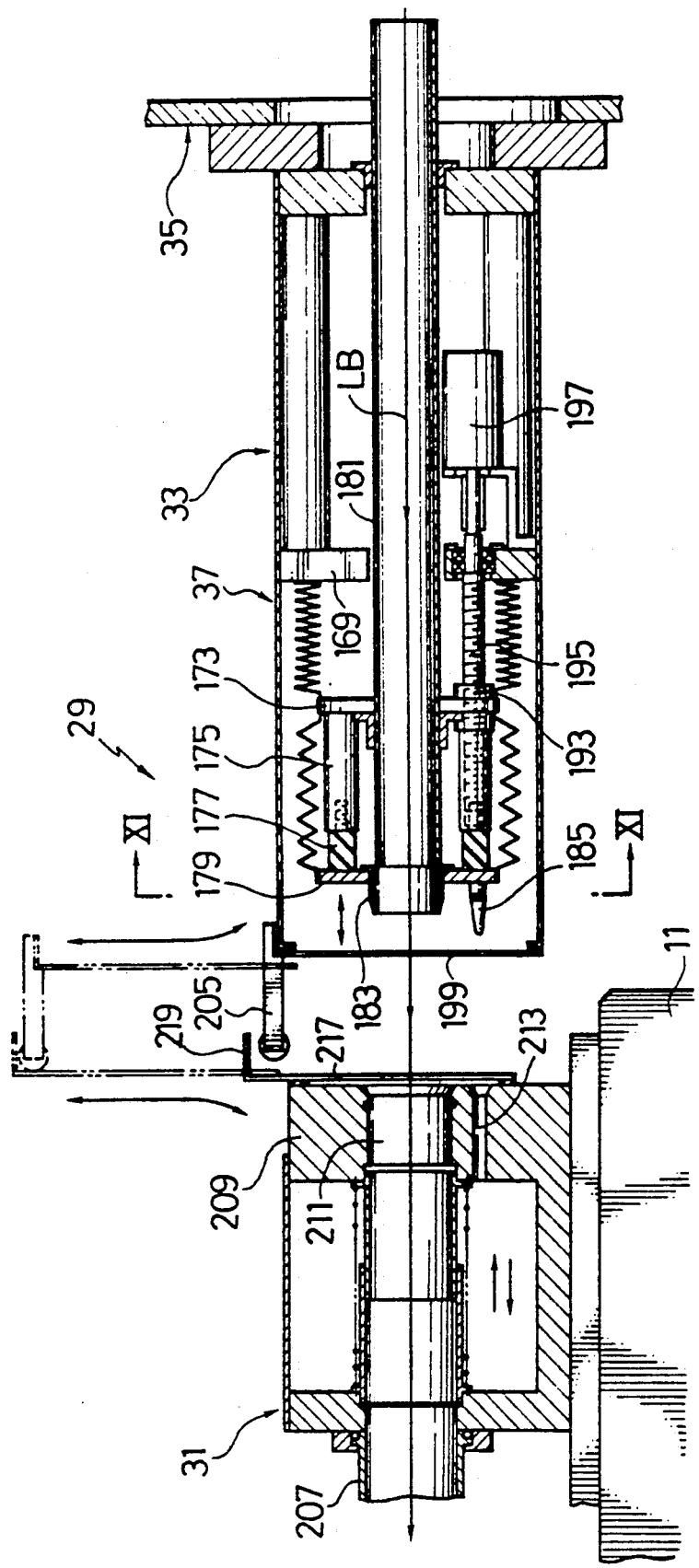
FIG. 9 is a sectional drawing showing the connection section.
Figure 10:
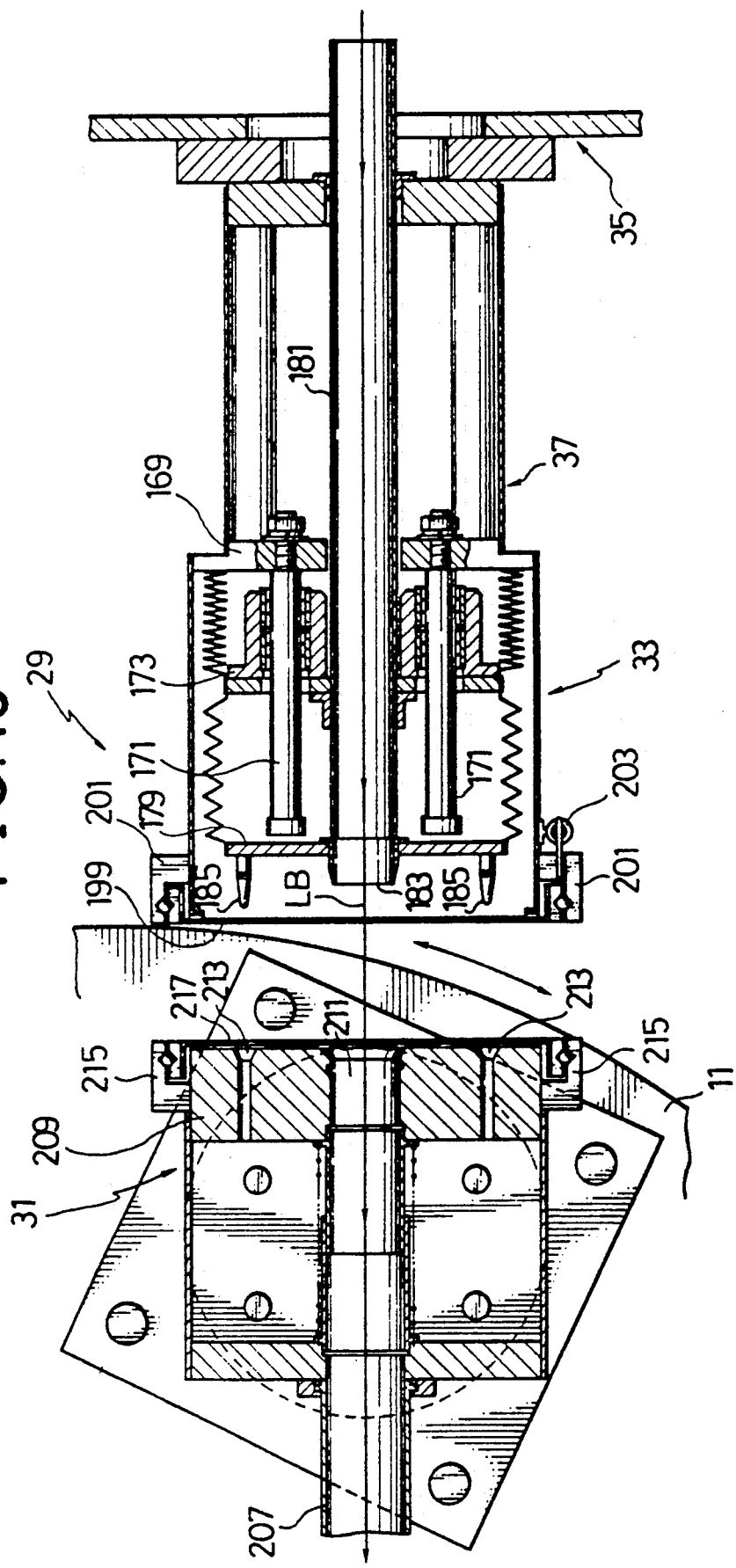
FIG. 10 is a plan view of the sectional drawing of FIG. 9.

Now referring to FIG. 9 and FIG. 10, a ring-shaped support plate 169 is provided integrally with the housing 35 in the housing extension section 37 of the housing 35 in which the beam path adjustment device 27 (not shown in FIG. 9 and FIG. 10) is built. A plurality of guide bars 171 which extend in the open direction of the housing extension section 37 are supported horizontally on the support plate 169, and an advancing/retracting member 173 is supported on the guide bar 171 so as to allow full forward and reverse movement.

A plurality of columns 175 which extend in the direction of the open section of the housing extension section 37 are mounted horizontally on the advancing/retreating member 173. A connection plate 179 is perpendicularly supported via a plurality of elastic members 177 such as, for example, rubber members, on the end section of the columns 175. Further a protection tube 181, through which the laser beam LB passes, is supported at the center of the advancing/retracting member 173.

Figure 11:
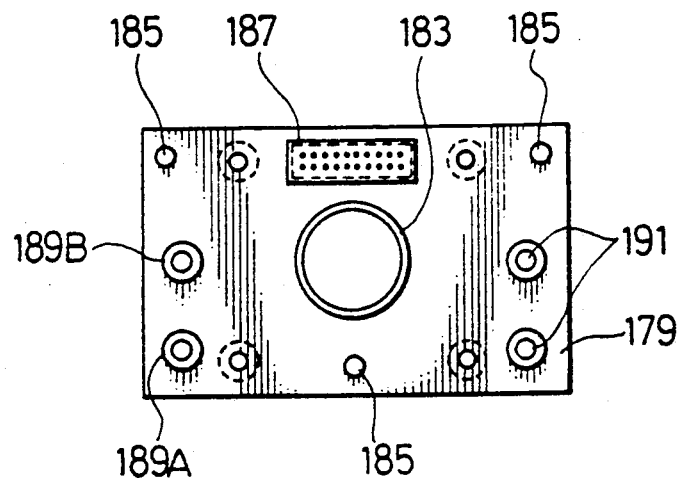
FIG. 11 is a drawing viewed in the direction of the arrows XI—XI in FIG. 9.

A guide port 183 which is connected to the protection tube 181 is provided at the center of the connection plate 179. A plurality of guide pins 185 which protrude horizontally are provided in several locations on the connection plate 179. In addition, an electrical connector 187 (wiring therein is omitted from the drawings) for establishing the electrical connection of various electrical products, such as motors, sensors, and the like which are mounted on the laser process head unit 25, as well as a pair of gas connectors 189A, 189B for connecting distribution lines (not shown) for assist gas, air, and the like, are provided on the connecting plate 179, as shown in FIG. 11. Further, water line connectors 191, connected to distribution lines for cooling water and the like, are provided on the connection plate 179.

A ball nut 193 is provided in a suitable position on the advancing/retreating member 173 to activate the forward and reverse movement of the advancing/retreating member 173 along the guide bars 171. The ball nut 193 is screwed into a ball screw 195 which is supported in a freely rotatable manner on the support plate 169. The ball screw 195 is linkingly coupled to a servo motor 197 which is supported on the support plate 169.

Accordingly, it is possible to move the connection plate to approach and retreat from the first interface unit via the advancing/retreating member 173 in accordance with the rotary movement of the servo motor 197.

A dust cover 199 which can be freely opened and closed is provided at the open section of the housing extension section 37 in order to dustproof the inside of the housing extension section 37. Specifically, a cover guide 201 is provided in the vertical direction on the end section of the housing extension section 37. The dust cover 199 is supported on the cover guide 201 in a manner allowing free movement in the vertical direction. An air cylinder 203 mounted on the housing extension section 37 in a manner allowing free movememnt in the vertical direction is coupled to the dust cover 199. On the dust cover 199, there is provided a linkage arm 205 which is to be linked to a corresponding dust cover provided on the first interface side so as to ascend and descend it in such a manner that the dust cover 199 protrudes toward the first interface unit 31 side.

According to the above configuration, by moving the dust cover 199 vertically by the suitable action of the air cylinder 203, it is possible to open and close the open section of the housing extension section 37.

The first interface unit 31, as already explained with reference to FIG. 1, is mounted on the die holder 11 on the punch press 3. when the laser process head unit 25 is positionally indexed at the process station, the first interface unit 31 can be coupled to the opposed second interface unit 33. A tube for protecting the laser beam is provided between the first interface unit 31 and the laser process head unit 25.

Further, wiring (omitted from the drawings) connecting various types of electric products such as motors, sensors, and the like which are mounted on the laser process head unit 25, as well as various types of tubing and conduit (also omitted from the drawings) for assist gas, air, and cooling water, are provided between the first interface unit 31 and the laser process head unit 25.

A guide port 211 to be connected to the guide port 183 on the second interface unit is provided on a connecting block 209 wherein the first interface unit 31 opposes the second interface unit 33. Further, engaging orifices 213 into which each of the guide pins 185 is freely engageable and disengageable are also formed on the connecting block 209. In addition, on the connection block 209, various types of connectors (omitted from the drawings) which are to be connected respectively with the electrical connector 187, the gas connectors 189A, 189B, and the water line connector 191 of the second interface unit 33.

In addition, a cover guide 215 is provided on the connection block 209. A dust cover 217 is freely guided vertically on the cover guide 215. An engaging section 219, which engages with the linkage arm 205 provided on the dust cover 199 on the second interface unit 33 side, is formed on the dust cover 217.

As a result of the configuration described above, the air cylinder 203 is activated to elevate the one dust cover 199 and under the state that the first and second interface units 31, 33 are in mutual opposition, the engaging section 219 of the other dust cover is pressed upward by means of the linkage arm 205 provided on the dust cover 199, so that both dust covers 119, 217 are elevated simultaneously.

As described above, in the condition where both dust covers 199, 217 are elevated, the advancing/retracting member 173 and the connection plate 179 of the second interface unit 33 are advanced toward the first interface unit 31 side, the connection plate 179 of the second interface unit 33 is connected with the connection block 209 of the first interface unit 31, so that the various types of connectors are connected. Accordingly, the laser beam LB can be supplied from the laser generator 23 to the laser process head unit 25, the motors 131, 145 provided on the laser process head unit 25 can be controlled, and the assist gas can be sprayed from the nozzle 91.

Namely, the laser processing becomes possible by connecting the first interface unit 31 and the second interface unit 33.

As explained, before connecting the first and second interface units 31, 33 to start the laser process, it is important to detect whether or not the center of the laser beam LB is in alignment with, for example, the central axis of the tool mounting hole 87 in which the laser process head unit 25 is mounted.

Figure 12:
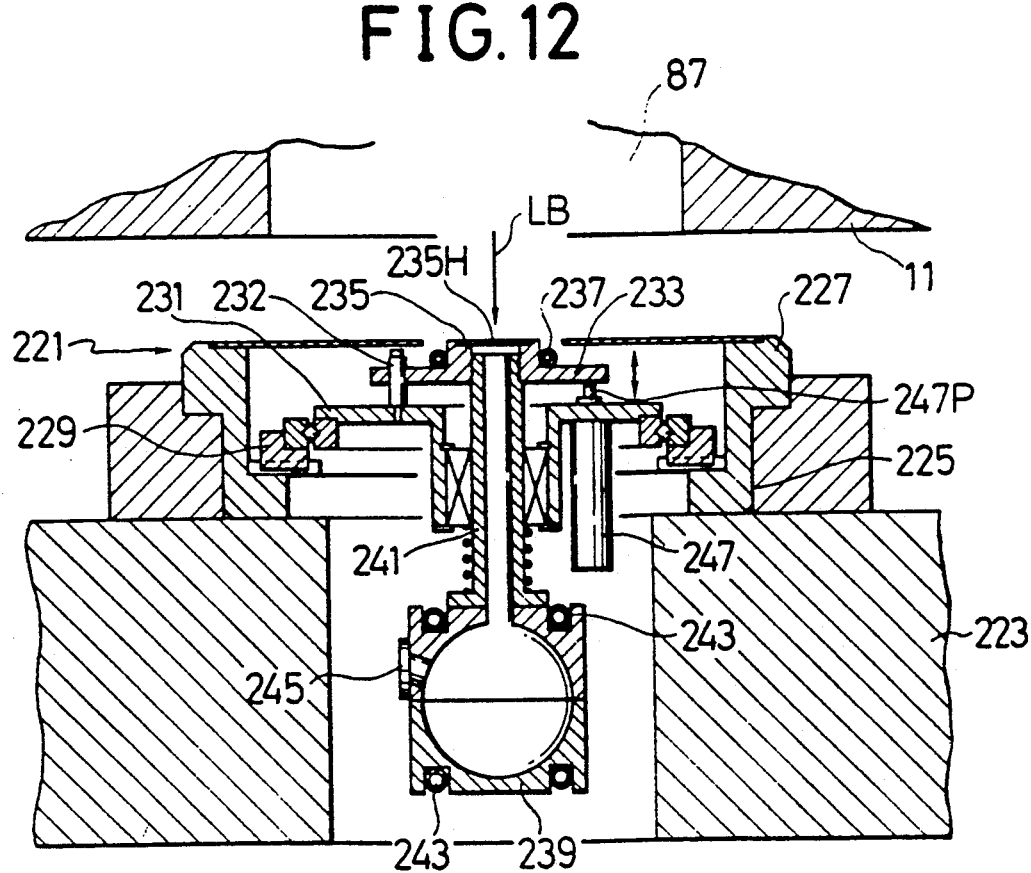
FIG. 12 is a sectional drawing of a laser beam detection device.

Accordingly, in this embodiment of the present invention, a beam detection device 221 as shown in FIG. 12 is provided which can detect the center of the laser beam LB and can detect the position of the focal point of the condensing lens 93 mounted on the laser process head unit 25.

More specifically, the beam detection device 221 is used by being mounted in a tool mounting hole 225 formed in a lower die holder 223. The beam detection device 221 is normally removed from the tool mounting hole 225 and only used when detecting the laser beam LB.

Now referring to FIG. 12, a circular casing 227 on the beam detection device 221 is fitted within the tool mounting hole 225 of the lower tool holder 223 in a freely mountable/dismountable manner such that the central axis of the circular casing 227 is substantially aligned with the center axis of the tool mounting hole 225. In the casing 227, a U-table 229 is provided in a freely position-adjustable manner in the U-axis direction corresponding to the X-axis. On the U-table 229, a V-table 231 is supported in a freely position-adjustable manner in the V-axis direction corresponding to the Y-axis. Further, on the V-table 231, a Z-table 233 is supported in a manner allowing free vertical movement along a guide pin 232 erected on the V-table 231.

On the Z-table 233, an aperture plate 235, provided with a small aperture 235H in its center section through which the laser beam LB freely passes, is mounted. A cooling water tube 237 is also mounted on the Z-table 233. In addition, on the Z-table 233, a conduit 241 such as a light guide is provided in order to lead the laser beam LB which passes through the small aperture 235H in the aperture plate 235 to an integrating sphere 239. The integrating sphere 239 is cooled with a cooling water tube 243. A power sensor 245 which detects the output of the laser beam LB is provided at a suitable position on the integrating sphere 239.

A vertical movement adjustment motor 247 is mounted on the V-table 231 in order to move the Z-table 233 vertically. The tip of a plunger 247P which is moved vertically by the rotation of the motor 247 abuts on the Z-table 233.

In the foregoing configuration, when the laser beam LB is to be detected, the condensing lens 93 (FIG. 6–8) on the laser process head unit 25 is removed and the laser beam LB from the laser generator 23 becomes a small diameter guide beam.

Figure 13A:
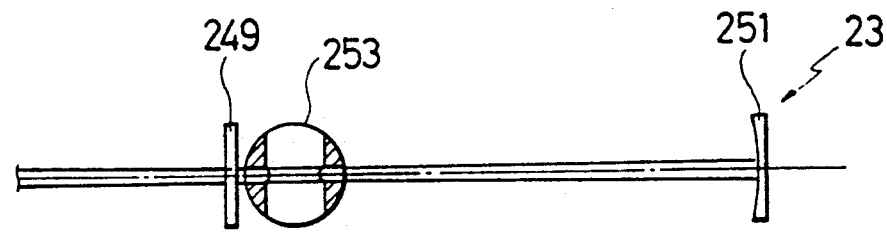
FIGS. 13 (A), (B), and (C) are explanatory drawings of the laser beam generator.
Figure 13B:
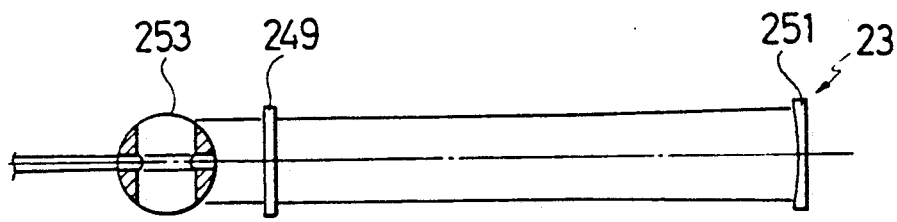
Figure 13C:
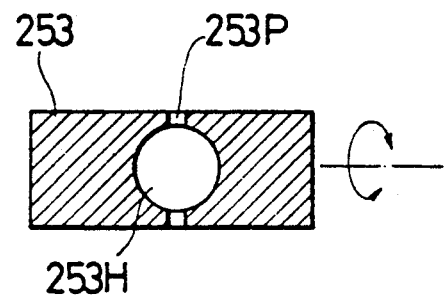

As a method of obtaining the small diameter guide beam, it is possible to use a configuration in which, as shown in FIG. 13(A), a pinhole aperture 253 provided with a pinhole of suitable diameter is inserted between an output mirror 249 on the laser generator 23 and a rear mirror 251, or, as shown in FIG. 13(B), a configuration in which the pinhole aperture 253 is positioned outside of the output mirror 249. As the pinhole aperture 253, it is desirable to use a configuration in which, as shown in FIG. 13(C), a pinhole 253P and a large diameter aperture 253H are provided at right angles to one another in a cylindrical portion, and by a 90° rotation of the cylindrical portion, the use for the normal laser beam generator can be exchanged to the use for the small diameter guide beam. The cylinder (253) as shown in FIGS. 13(A), 13(B), and 13(C) is provided in the laser generator (23) to obtain the small diameter guide beam for detecting the center of the laser beam by means of the beam detection device.

The small diameter guide beam thus obtained by means of the foregoing configuration is conducted from the laser process head unit 25 to the beam detection device 221. Then, the U-table 229 and the V-table 231 are suitably moved so as to align the guide beam with the small aperture 235H in the aperture plate 235. In this case, the position at which the value detected by the power sensor 245 becomes a maximum is the position where the center of the guide beam and the center of the small diameter aperture 235H are accurately aligned. Accordingly, by detecting the position of the U-table 229 and the V-table 231 at this time, using a position detector, it is possible to detect the amount of deviation of the center of the laser beam LB with respect to the center of the tool mounting hole 87.

After the center of the laser beam LB is detected in this manner, the condensing lens 93 is mounted on the laser process head unit 25. Then, the vertical adjustment motor 247 is rotated so as to control the movement of the Z-table 233 in the vertical direction, so that the position at which the output of the power sensor 245 becomes a maximum can be detected. When the position of the focal point of the condensing lens 93 and the small aperture 235H of the aperture plate 235 coincide with each other, the output of the power sensor 245 becomes a maximum. Therefore, by detecting the height of the position of the aperture plate 235 when the output of the power sensor becomes the maximum, it is possible to detect the position of the focal point of the condensing lens 93.

After the position of the center of the laser beam LB and the position of the focal point of the condensing lens 93 have been detected, as outlined above, the beam detection device 221 is removed from the tool mounting hole 225, and, as shown in FIG. 6 and FIG. 7, the workpiece support ring 255 is mounted in place of the beam detection device 221, whereby the laser process becomes possible. In addition, when the laser process is being carried out, the laser beam passes through the large diameter aperture 253H of the pinhole aperture 253 on the laser generator 23.

Figure 14:
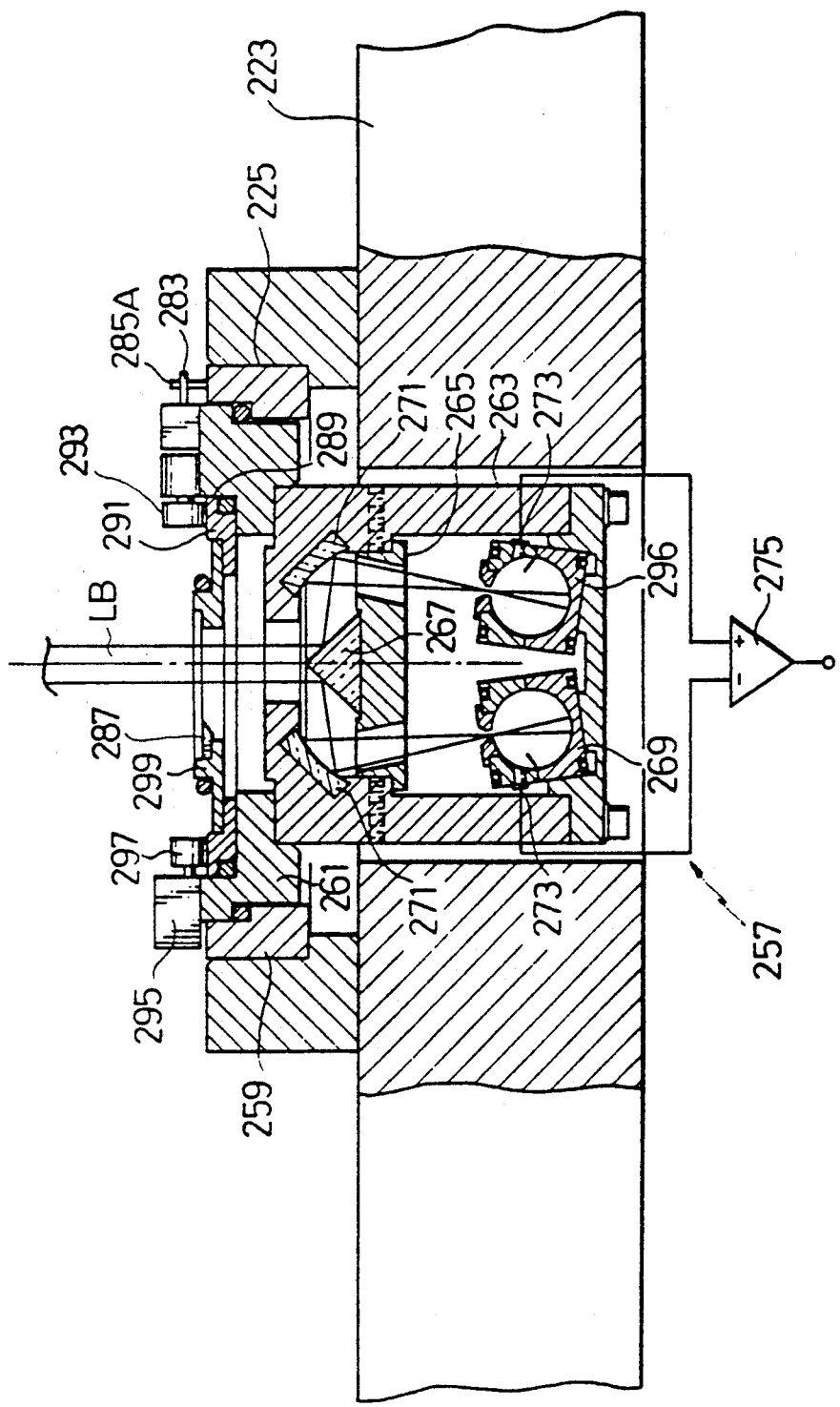
FIG. 14 is a sectional drawing of another type of laser beam detection device.
Figure 15:
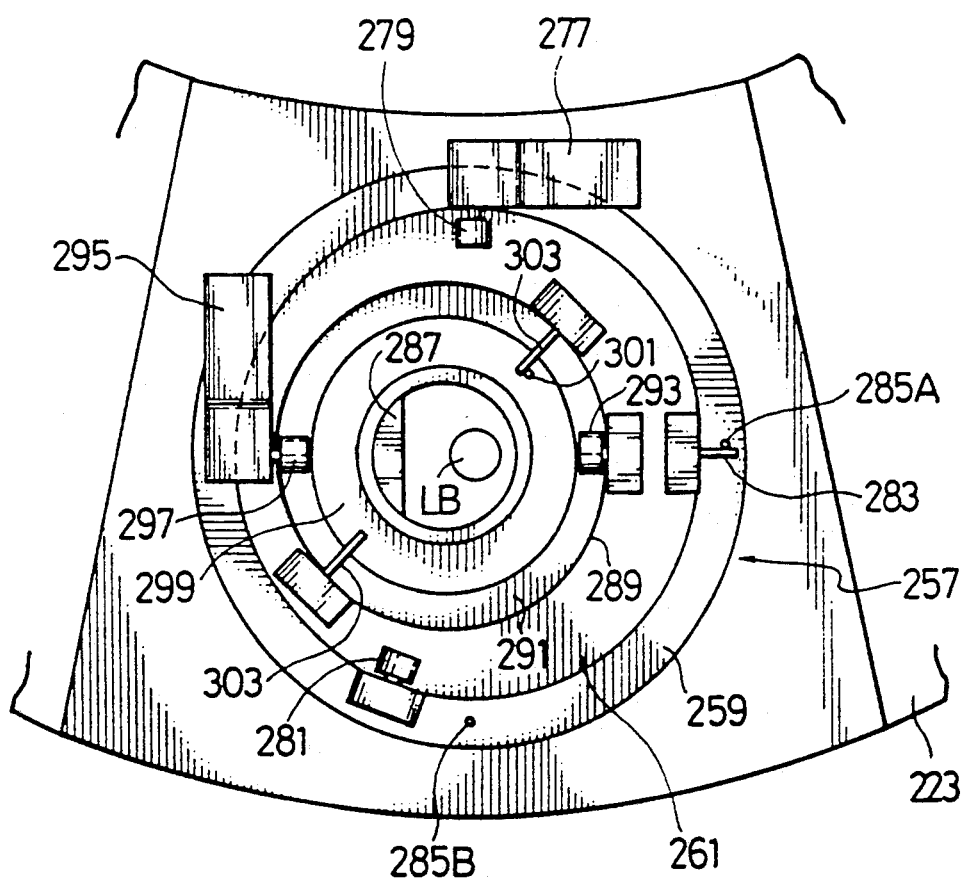
FIG. 15 is a plan view of FIG. 14.
Figure 16:
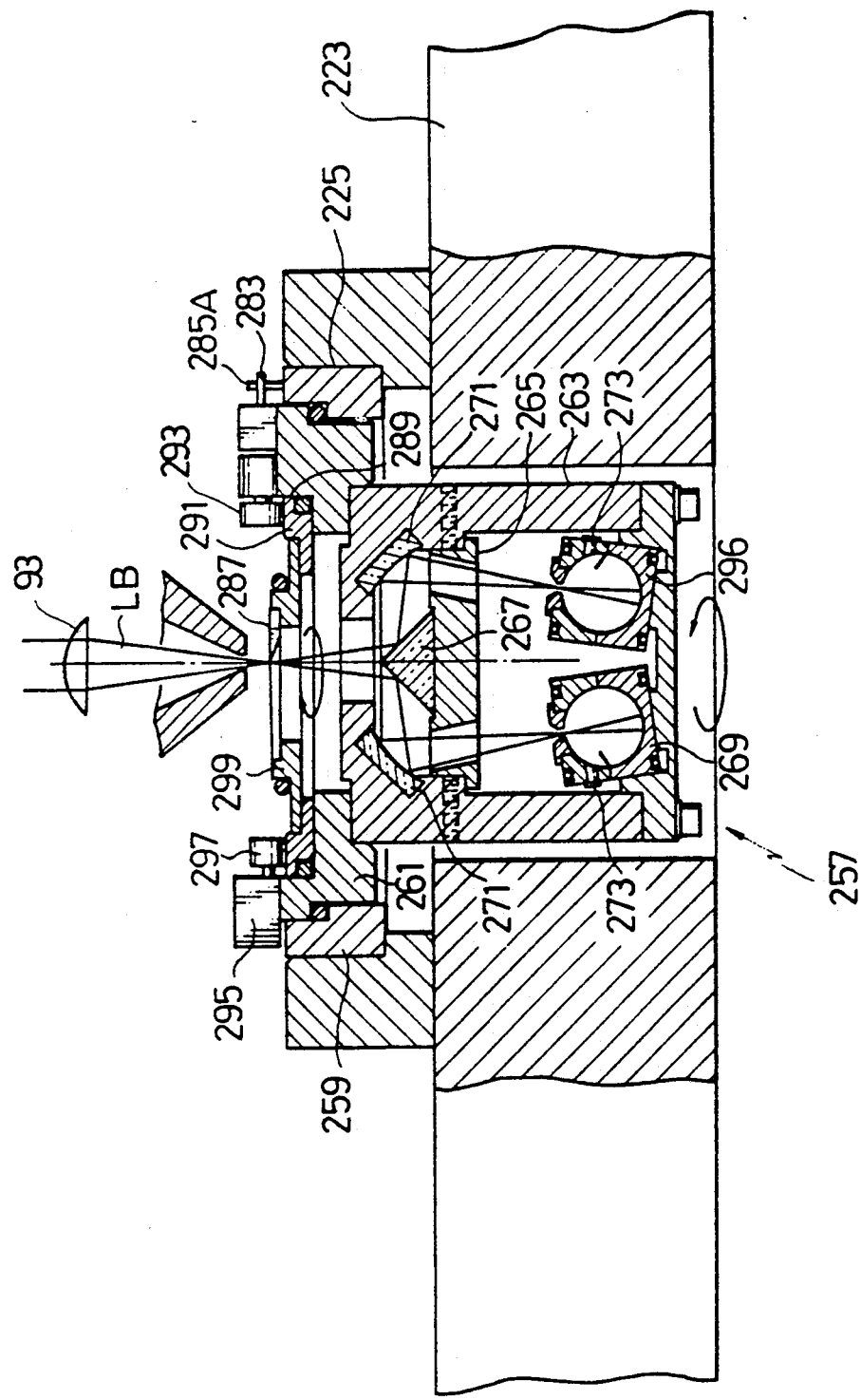
FIG. 16 is a sectional drawing of a modification of the device of FIG. 14.

FIGS. 14 to 16 show the configuration of another embodiment of the beam detection device 257. This beam detection device 257 is provided with a ring-shaped casing 259 which is to be fitted in the tool mounting hole 225 of the lower die holder 223 in a freely mountable/dismountable manner. A rotary holder 261 is supported in a freely rotatable manner in the casing 259. A cylindrical detector housing 263 is installed below the rotary holder 261. A beam splitting device 267 such as a cube mirror which splits the laser beam LB into a plurality of beams (two beams in this embodiment) is provided at the center section of a disc-shaped mirror holder 265 mounted in the detector housing 263.

In the detector housing 263, concave mirrors 271 are provided which condense the laser beam which has been split by the beam splitter 267 and directs then to integrating spheres 269 provided on the bottom of the detector housing 263. Each of the integrating spheres 269 is usually water cooled, and each is provided with a power sensor 273. Each of the power sensors 273 is connected to a comparator 275 in which the detected values are compared.

Accordingly, when the values detected by the power sensors 273 are compared in the comparator 275, it can be determined whether or not the laser beam has been split into equal beams. When the values detected by the power sensors 273 are not equal, the U-axis adjustment motor 71 on the beam path adjustment device 27 is operated, the beam path of the laser beam LB is displaced in the U-axis direction, so that adjustments are made such that all the values detected by the power sensors 273 are equal.

Next, the rotary holder 261 is rotated 90° and the values detected by the power sensors 273 are compared. In this case, the V-axis adjustment motor 61 on the beam path adjustment device 27 is operated so as to displace the beam path of the laser beam LB in the V-axis direction, so that it is possible to equalize the values detected by the power sensors 273.

Specifically, by rotating the rotary holder 261 90° and adjusting the beam path of the laser beam LB such that the values measured by the power sensors 273 become equal, the position of the beam path of the laser beam LB in the U and V directions can be accurately adjusted.

A first motor 277 is mounted on the casing 259 in order to automatically rotate the rotary holder 261 with respect to the casing 259. A roller 279 mounted on the output shaft of the motor 277 is pressurizingly abutted to the top surface of the rotary holder 261. In addition, on the casing 259, there is provided a pressure roll 281 which prevents the rotary holder 261 from floating. A horizontal pin 283 is provided on the rotary holder 261 in order to accurately rotate the rotary holder 261 by 90°. Further, at the two places on the casing 259 there are provided a pair of erected stopper pins 285A, 285B which contact the horizontal pin 283 in order to regulate the rotation of the rotary holder 261 to 90°.

Accordingly, the rotary holder 261 can be automatically rotated by operating the first motor 277 and it is possible to position the rotary holder 261 accurately in a position offset by a 90° rotation by halting the operation of the first motor 277 when the pin 283 provided on the rotary holder 261 contacts one of the stopper pins 285A, 285B.

A shielding member 287, such as a knife edge which can freely shield one part of the laser beam LB, is provided on the beam detection device 257 in order to detect the position of the focal point of the condensing lens 93 provided on the laser process head unit 25.

More specifically, an eccentric concave section 289, for which the dgree of eccentricity is almost equivalent to the radius of the laser beam LB, is formed on the top surface of the rotary holder 261. A holder ring 291 is rotatably fitted within the eccentric concave section 289. This holder ring 291 is retained in the eccentric concave section 289 by a pressure roller 293 mounted on the rotary holder 261. In addition, a drive roller 297, which is installed at the output of a second motor 295 mounted on the rotary holder 261, is pressurizingly abutted to the top surface of the holder ring 291.

Therefore, the holder ring 291 is automatically rotated with respect to the rotary holder 261 by the operation of the second motor 295. The shielding member 287 is mounted in a position which is slightly eccentric relative to the center of a ring-shaped holder 299 mounted on the holder ring 291. In the position shown in FIGS. 14 and 15, the shielding member 287 is positioned such that it does not shield the laser beam LB. When the holder ring 291 is rotated 180°, as shown in FIG. 16, an edge of the shielding member 287 is positioned close to the central axis of the laser LB, which shields one part of the laser beam LB.

In order to regulate the 180° rotations of the holder ring 291, two stopper pins 303 which contact a pin 301 erected on the holder ring 291 are mounted, out of phase by 180°, on the rotary holder 261.

According to the configuration outlined above, when the shielding member 287 is positioned to shield one part of the laser beam LB, the values detected by the two power sensors 273 vary as shown in FIGS. 17(A) to (D) due to the positional relationship of the laser beam LB to the shielding member 287. Therefore, by operating, one or both of the motors 131, 145 on the laser process head unit 25 to adjust the vertical position of the condensing lens 93, it is possible to match the position of the focal point of the condensing lens 93 with the position of the shielding member 287, so that the position of the focal point can be detected.

Figure 17A:
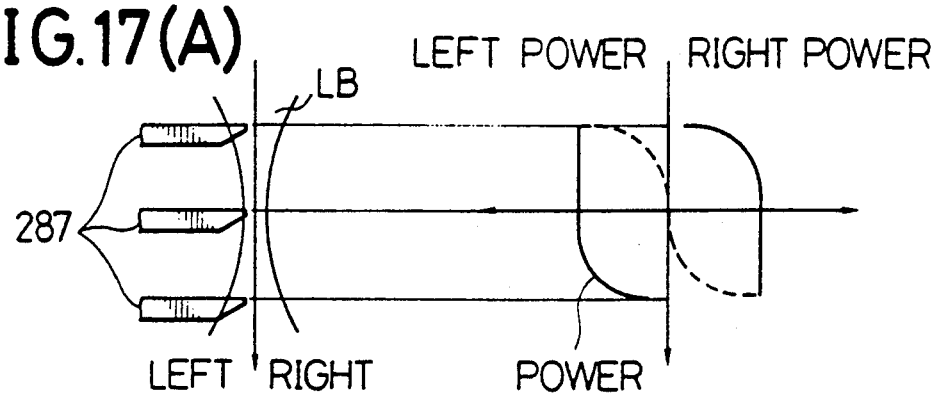
FIGS. 17 (A), (B), (C) and (D) are explanatory drawings of the values detected by the power sensors according to the positional relationship of the laser beam and the shield member.
Figure 17B:
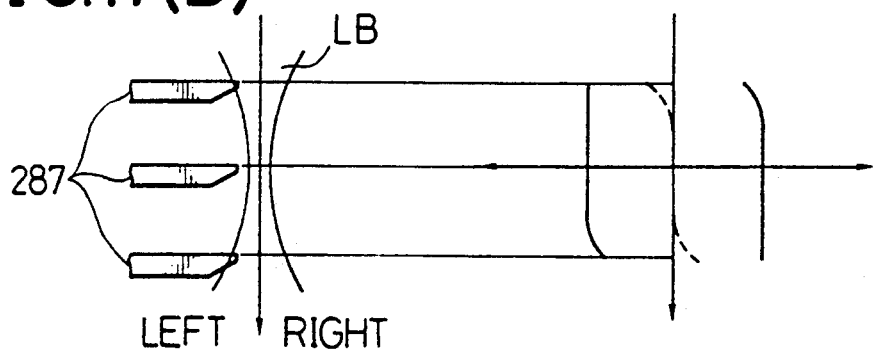
Figure 17C:
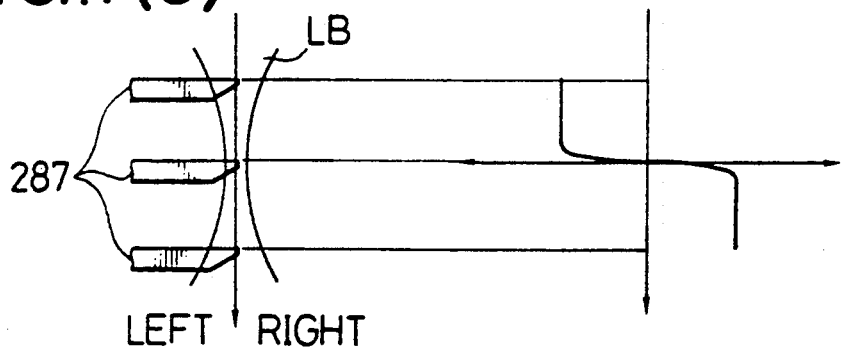
Figure 17D:
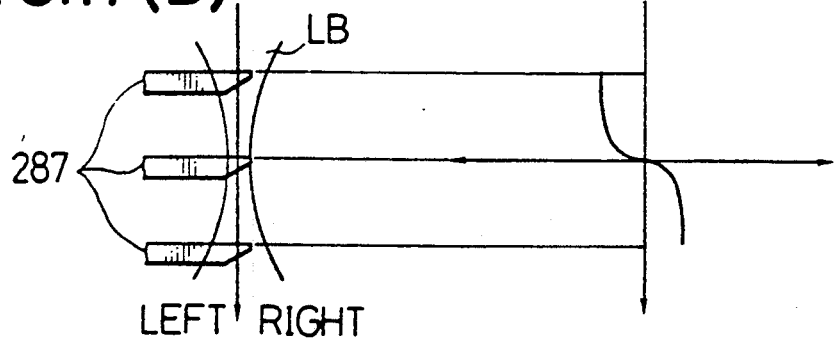

For example, in the case shown in FIGS. 17(A) and 17(B), the relative height position at which difference between the detected values in the two power sensors becomes zero should be detected. In the cases shown in FIGS. 17(C) and 17(D), the relative height position at which the detection in one power sensor is changed to the detection in the other power sensor should be detected.

As has previously been explained, with the foregoing configuration the connection between the first and second interface units 31, 32 on the connection device 29 is maintained in the released state when the punching process is being performed on the workpiece W by the punch press 3. In the same manner as with a usual turret punch press, the upper and lower turrets are rotated, the desired upper and lower dies are positionally indexed at the process station, and the punching process is carried out.

Because the shock-like vibration which occurs during the punching process is absorbed by a vibration-proof support mechanism, no ill effects from the vibration are felt by the laser process head unit 25. Also, because the laser generator 23 and the beam path adjustment device 27 are installed at some distance from the punch press, they do not receive any direct vibration, so that any effects from the vibration are minor.

After the punching process has been completed and the laser process is to be carried out, the upper and lower turrets are suitably rotated and the laser process head unit 25 is positionally indexed at the process station. Thereafter, the first and second interface units 31, 33 on the connection device 29 are connected together. As shown in FIG. 1, a suction port 309 of a flexible duct 307 connected to a suction device 305 provided in the punch press 3 is connected to a normal scrap disposal opening which communicates with the process station by using an operation of a hydraulic cylinder 311, and then a suction operation is performed.

A suction port member may be mounted at the tool mounting hole of the lower turret of the punch press. The suction port member may be provided with a connection device which is freely mountable and dismountable in the same manner as the first and second interface units, making it possible to connect the suction port member to the suction device.

As can be understood from the foregoing embodiments, according to the present invention, since adjustment of the laser beam path can be performed at the side of the laser generator, the adjusting operation becomes easy and the adjustment section is virtually unaffected by the vibration from the punch press.

In addition, since the laser process head unit can easily be mounted on an existing punch press and it is supported by a vibration-proof support device, the laser process head unit is also virtually unaffected by vibration during the punching operation.

Furthermore, according to the present invention, the laser process head unit can easily be connected to the laser generator.

Moreover, according to the present invention, the position of the central axis of the laser beam and the position of the focal point of the condensing lens can both be easily detected.

What is claimed is:

1. A punch press having a V-axis and a laser cutting device, which comprises:
   a laser cutting head mounted on the punch press;
   a laser generator provided in a position spaced from the punch press; and
   means for laser beam path adjustment of a laser beam from the laser generator to the laser cutting head, wherein the means for beam path adjustment comprises a plurality of reflective surfaces which suitably bend the laser beam and are positioned on the laser generator side spaced from the laser cutting head.

2. The punch press of claim 1, wherein the plurality of reflective surfaces of the means for laser beam path adjustment comprises:
   a first reflective surface which reflects the laser beam from the laser generator toward the V-axis direction:
   a second reflective surface which is adjustably supported on a V-axis table in the V-axis direction and which directs the laser beam reflected in the V-axis direction by the first reflective surface toward a U-axis direction perpendicular to the V-axis; and
   a third reflective surface supported on a U-axis table which is adjustably supported on the V-axis table in the U-axis direction, and which reflects the laser beam reflected in the U-axis direction by the second reflective surface toward the laser cutting head.

3. A laser cutting head for use in a punch press having a laser cutting device, the punch press having an upper die holder with a tool mounting hole, and the laser cutting device having a laser generator, which comprises:
   a cylindrical outer guide removably mounted in the tool mounting hole of the upper die holder;
   inner guide means for supporting (i) a nozzle, (ii) a condensing lens, and (iii) a reflective surface which directs a laser beam from the laser generator perpendicularly downward to the condensing lens; and
   means for vibration isolation support of the inner guide so as to allow vertical movement thereof inside the outer guide such that transmission of vibration from the outer guide to the inner guide is reduced.

4. The laser cutting head of claim 3, wherein the means for vibration isolation comprises:
   elastic means for supporting the inner guide in a floating condition with respect to the outer guide;
   an air damper capable of dimensional change between the outer guide and the inner guide; and
   means for ensuring the presence of a pressure in the air damper.

5. The laser cutting head of claim 3 further comprising a vertically adjustable slide inside the inner guide, wherein the nozzle, the condensing lens, and the reflective surface are mounted on the slide, and wherein the condensing lens is adjustable in the vertical direction.

6. The laser cutting head of claim 5, wherein the slide comprises:
   a cylindrical outer holder removably and adjustably threaded to the part of the slide on which the condensing lens is supported; and
   a cylindrical inner holder inside the outer holder which provides free center-axis adjustment thereof and the cylindrical inner holder is normally biased in the axial direction, wherein the condensing lens is supported on the inner holder.

7. A connection device for use in a laser punch press having a punch press and a laser process device, which connects a laser process head unit of the laser process device mounted in a suitable position on the punch press and a laser generator provided in a position at a distance from the punch press process station, which comprises:

a first interface unit provided on the punch press side, the first interface unit comprising a tube guide port for protecting a laser beam directed to a bend mirror in the laser process head unit, a gas connector for an assist gas supplied to the laser process head unit, and an electrical connector connected to an electrical device in the laser process unit;

a second interface unit provided on the laser generator side, the second interface unit comprising a guide port, a gas connector and an electrical connector which are corresponding to the guide port, the gas connector and the electrical connector of the first interface unit, respectively and connectable thereto; and at least one of the first and second interface units being constructed such that it can freely approach to or retreat from the other.

8. The connection device of claim 7, further including a connection section in which the first and second interface units are opposed; a dust cover mounted in a freely opening and closing manner adjacent each interface unit at the connection section, which protects the connection section; and a dust cover opening and closing device which opens and closes the dust cover provided on at least one of the interface units.

9. Beam detection apparatus for use in a punch press having a lower die holder and a laser cutting device, which comprises:

a casing removably mounted on the lower die holder of the punch press;

a U-V table adjustably supported in the U-axis and the V-axis directions on the casing;

a Z-table adjustably supported in the vertical direction on the U-V table, said Z-table including a small diameter alignment aperture; and means for detecting the laser beam passing through the alignment aperture.

10. Beam detection apparatus for use in a punch press having a lower die holder and a laser cutting device, which comprises:

a casing remomably mounted on the lower die holder of the punch press;

a rotary holder rotatably supported on the casing;

means for splitting a laser beam into a plurality of beams, comprising a beam splitter supported in the rotary holder;

a plurality of means for detecting the outputs from the plurality of beams; and means for comparing the values detected by the plurality of detecting means.

11. The beam detection apparatus of claim 10, further comprising means for shielding part of the laser beam directed onto the beam splitter, wherein the position of the beam shielding means is capable of being freely shifted between a shielding state position and a non-shielding state condition.

12. In a punch press having a lower die holder and a beam deflection device including a casing which is freely mountable and dismountable to and from the lower die holder, a rotary holder supported in a freely rotatable manner on said casing, means for generating a laser beam, a beam splitter supported in said rotatable holder and capable of splitting said beam into a plurality of laser beams, a plurality of power sensors capable of detecting the plural laser beams, and a comparator capable of comparing detected laser beam values, the method of detecting the center of the laser beam which comprises:

generating a laser beam;
directing said laser beam to said beam splitter;
splitting said laser beam into a plurality of laser beams with said beam splitter;
detecting said plural laser beams with said sensors; and
oscillating the laser beam so as to equalize the values detected by each of said power sensors.

13. In a punch press having a lower die holder and a beam deflection device including a casing which is freely mountable and dismountable to and from the lower die holder, a rotary holder supported in a freely rotatable manner on said casing, means for generating a laser beam, a beam splitter supported in said rotatable holder and capable of splitting said beam into a plurality of laser beams, a plurality of power sensors capable of detecting the plural laser beams, shielding means for shielding part of the beam splitter from a laser beam directed onto the beam splitter and being capable of being changed from a substantially shielding position to a substantially non-shielding position, and a comparator capable of comparing detected laser beam values, the method of detecting the focal position of a condensing lens which comprises:

generating a laser beam;
directing said laser beam along a beam path to said beam splitter;
reducing the diameter of the laser beam by interposing said shielding means to a substantially shielding position;
splitting said laser beam into a plurality of laser beams with said beam splitter;
detecting said plural laser beams with said sensors; and
moving the condensing lens along the beam path so as to maximize the values detected by at least two of said power sensors.

14. A punch press having a V-axis and a laser cutting device, which comprises:

a laser cutting head on the punch press;
a laser generator provided in a position spaced from the punch press; and
means for laser beam path adjustment of a laser beam from the laser generator to the laser cutting head, wherein the means for beam path adjustment comprises
(i) a first reflective surface which reflects the laser beam from the laser generator toward the V-axis direction;
(ii) a second reflective surface which is adjustably supported on a V-axis table in the V-axis direction and which directs the laser beam, reflected in the V-axis direction by the first reflective surface, toward a U-axis direction perpendicular to the V-axis; and
(iii) a third reflective surface supported on a U-axis table which is adjustably supported on the V-axis table in the U-axis direction, and which reflects the laser beam reflected in the U-axis direction by the second reflective surface toward the laser cutting head which suitably bends the laser beam,
said means for beam path adjustment being positioned between the laser generator and the laser cutting head.

* * * * *